United States Patent
Hart

(10) Patent No.: US 6,571,831 B1
(45) Date of Patent: Jun. 3, 2003

(54) FLOW REGULATOR

(75) Inventor: Keith Hart, Worcestershire (GB)

(73) Assignee: Dieter Wildfang GmbH, Müllheim (DE)

( * ) Notice: Subject to any disclaimer, the term of this patent is extended or adjusted under 35 U.S.C. 154(b) by 0 days.

(21) Appl. No.: 10/030,809

(22) PCT Filed: Jul. 10, 2000

(86) PCT No.: PCT/EP00/06531

§ 371 (c)(1), (2), (4) Date: Jan. 11, 2002

(87) PCT Pub. No.: WO01/04714

PCT Pub. Date: Jan. 18, 2001

(30) Foreign Application Priority Data

Jul. 13, 1999 (DE) .......................................... 199 32 596

(51) Int. Cl.[7] .............................................. F16K 15/08
(52) U.S. Cl. ............................................ 138/46; 138/45
(58) Field of Search ................. 138/46, 45; 239/533.14

(56) References Cited

U.S. PATENT DOCUMENTS

| | | | | |
|---|---|---|---|---|
| 3,409,050 A | * | 11/1968 | Weese ........................ | 137/517 |
| 3,847,178 A | * | 11/1974 | Keppel ..................... | 137/515.7 |
| 4,000,857 A | | 1/1977 | Moen ....................... | 239/428.5 |
| 4,883,093 A | * | 11/1989 | Miles et al. ................. | 137/517 |
| 4,976,283 A | * | 12/1990 | Wildfang et al. ........... | 137/504 |
| 5,027,861 A | * | 7/1991 | Gute .......................... | 138/43 |
| 5,209,265 A | * | 5/1993 | Taguri et al. ................. | 138/40 |
| 5,634,491 A | * | 6/1997 | Benedict ...................... | 137/504 |

FOREIGN PATENT DOCUMENTS

| | | |
|---|---|---|
| DE | 2131117 | 1/1973 |
| DE | 4041116 A1 | 6/1992 |
| WO | WO9821419 | 5/1998 |

* cited by examiner

*Primary Examiner*—Patrick Brinson
(74) *Attorney, Agent, or Firm*—Volpe and Koenig, P.C.

(57) ABSTRACT

A flow regulator (1) having a regulator housing (2) with a control peg (4) in a passage channel that encompasses an annular flow restrictor (5) made of elastic material. The flow restrictor defines a control gap (6) located between itself and at least one part that is fixed to the housing. The passage cross-section of the gap can be modified by deformation of the flow restrictor resulting from the difference in pressure during cross flow. Spaced recesses (7, 8) oriented in the flow direction are provided in a peripheral direction on the surfaces of the part fixed to the housing defining the control gap (6). The regulation recesses are on the inner surface of the regulator housing (2) and on the peripheral surface of the control peg. The desired flow rate is achieved at comparatively low liquid pressure and remains practically constant in case of increased or fluctuating liquid pressures.

6 Claims, 2 Drawing Sheets

FLOW REGULATOR

BACKGROUND

The invention concerns a flow regulator with a regulator housing which has a control peg or control cone in a passage channel which encompasses an annular flow restrictor of elastic material, which flow restrictor defines a control gap between itself and at least one part fixed in the housing. The cross section of the control gap is alterable due to the flow restrictor being deformed under the pressure differential formed during cross flow. The control gap is provided between the flow restrictor and the inner surface area of the regulator housing as well as between the flow restrictor and the peripheral surface area of the control peg or control cone, and regulator recesses are provided peripherally spaced at a distance from one another on the inner surface area of the regulator housing as well as on the peripheral surface area of the control peg or control cone.

Such flow regulators are used, for example, in water conduits in order to keep the flow amount conveyed per unit time as constant as possible even with strong pressure fluctuations.

Previously know flow regulators have a conically tapering control peg in a passage channel of their regulator housing which encompasses an annular flow restrictor of elastic material. This annular flow restrictor defines a control gap between itself and a part fixed in the housing, the mean diameter of which is alterable due to the flow restrictor being deformed under the pressure differential forming during cross flow. Here on the surface areas of the parts fixed in the housing defining the control gap, regulating recesses are provided set at a distance from one another peripherally and oriented in the direction of flow.

Thus, flow regulators are already known where the regulating recesses are provided on the inner surface of the regulator housing, and if need be a central passage hole is present. These previously known flow regulators nevertheless have the disadvantage that the amount of liquid flowing through per unit of time cannot be kept completely constant, but rather continues to increase slightly with rising pressure.

Also flow regulators are already known which have the regulator recesses on the peripheral surface area of the control peg (see for example DE 40 41 116 A1). These flow regulators are indeed distinguished in that the required flow amount is attained at a comparatively low fluid pressure, but frequently a flow maximum lying considerably above the flow standard value appears, which decreases again with rising pressure.

From DE-OS 21 31 117 a flow regulator is already known the elastic flow restrictor of which, depending upon water pressure, is pressed axially as well as radially against corresponding regulator surfaces. The elastic flow restrictor of the previously known flow regulator for this purpose encompasses a central contoured control peg. Above and beyond this, the elastic flow restrictor sits on a shoulder surface which is provided with a number of cavity-like depressions. These cavity-like depressions enable, at low connection pressure, an additional amount of liquid to flow through along the inner periphery of the regulator housing under the elastic flow restrictor. Moreover, the depressions provided on the shoulder surface results in the elastic flow restrictor not being able to run in or on throttling on or into the wave-like contoured control peg, since for the present a pressure differential necessary for its influx and deformation cannot build up in front of and behind the elastic ring. Only when the connection pressure becomes higher is the annular elastic flow restrictor pressed so far into the cavity-like depressions of the shoulder surface that it nestles sealing tightly into these, and consequently the pressure differential necessary for regulation can arise.

Due to the temporally staggered stress of the axial and radial control surfaces, the necessary regulating water amount is reached with the previously known flow regulator already at a comparatively low inlet pressure. The maximal flow through amount is nonetheless restricted even with this previously known flow regulator through the unobstructed width of the control gap remaining between the control peg and the flow restrictor.

From U.S. Pat. No. 4,000,857, a sanitary construction that is mounted on the end of a faucet. This known construction provides a jet forming control that includes a flow regulator of the type known in the art. The flow regulator includes a control peg that is encompassed by an annular flow restrictor made of elastic material. A control gap is formed between the flow restrictor and the inner surface area of the regulator housing on one side, and between the flow restrictor and the peripheral surface area of the control peg on the other side, whose cross-sectional area is changed by the deformation of the flow restrictor based on the pressure differential of the through flow. Regulator recesses which are peripherally spaced from one another and which are oriented in the flow direction are located on the inner surface area of the regulator housing and on the peripheral surface area of the control peg, and have the same cross-sectional form.

Also, this known flow regulator does not maintain the flow rate per unit time constant under varying fluid pressures for a desired flow through rate.

SUMMARY

There therefore exists in particular the object of creating a flow regulator of the above-mentioned type with a comparatively high maximal through flow amount which attains the desired through flow amount per unit of time at a comparatively low fluid pressure and remains practically constant even during rising or strongly fluctuating fluid pressures.

In order to attain this object, in accordance with the invention, the flow regulator in accordance with the previously noted art, in particular, the control recesses in the area of the flow restrictor have a variably formed cross-section, and that the control recesses for responding in the lower pressure ranges have a larger aperture width facing the flow restrictor in comparison to the regulating recesses for higher pressure ranges.

Also, with the flow regulator of the invention, the pressure-dependent deformation of the annular flow restrictor can act not only on one side, but also inwardly as well as outwardly, and control the corresponding flow cross sections of the regulating recesses. The flow regulator in accordance with the invention has regulating recesses which in the area of the flow restrictor have different cross-sections. Preferably, the control recesses for responding in the lower pressure ranges have a larger aperture width facing the flow restrictor in comparison to the regulating recesses for higher pressure ranges. The inventive flow regulator has the advantage, that the low pressure regulating recesses can be rapidly closed, while the high pressure responding regulating recesses are first being closed when the fluid pressure is very strong. It can be seen that the inventive flow regulator provides at the same time a high maximum through flow volume with a contrastingly small construction size, because the flow restrictor can at the same time and synchronously be deformed in the direction of the regulating recesses provided on both sides, and since, on both sides of this flow restrictor, in each case a control gap with parallel water streams to be adjusted is provided.

To be sure, variously shaped wave-like formations are provided on the central control peg of the previously known flow regulator from DE-OS 21 31 117. However, these wave-like formations nevertheless only define typically uniform regulating recesses. Variously shaped regulating recesses in contrast are not provided in DE-OS 21 31 117.

It is possible that the regulating recesses on the inner surface area of the regulator housing as well as the on the peripheral surface area of the control peg or control cone can be provided with variously shaped cross sections in the area of the flow restrictor.

For separation and optimizing functions, a preferred embodiment in accordance with the invention provides that the regulating recesses on the inner surface area of the regulating recesses have a differently shaped cross section in comparison to those on the peripheral surface area of the control peg or control cone.

Here it can be advantageous if the regulating recesses are provided with the greater unobstructed aperture width on the inner surface area of the regulator housing or on the peripheral surface area of the control peg.

In order to be able to activate the regulating recesses with the larger unobstructed aperture width even at comparatively low pressures from elastic rubber flow restrictors, it can be advantageous for the regulating recesses with the greater unobstructed aperture width to have a somewhat circle segment-like cross section.

In contrast, the regulating recesses responding especially at high fluid pressures of the flowing medium can be so configured that these regulating recesses with the smaller unobstructed aperture width are configured, at least in a partial region, as a semicircle and/or with steep sides.

The exact configuration of the regulating recesses can be determined as a function of the elastic properties of the annular elastomer.

BRIEF DESCRIPTION OF THE DRAWINGS

Further features of the invention are provided in the following description of the preferred embodiment of the invention in connection with the claims as well as the drawings. The individual features can be utilized each by itself or several at a time in an embodiment in accordance with the invention.

In the drawings.

DETAILED DESCRIPTION OF THE PREFERRED EMBODIMENTS

Figure 2:
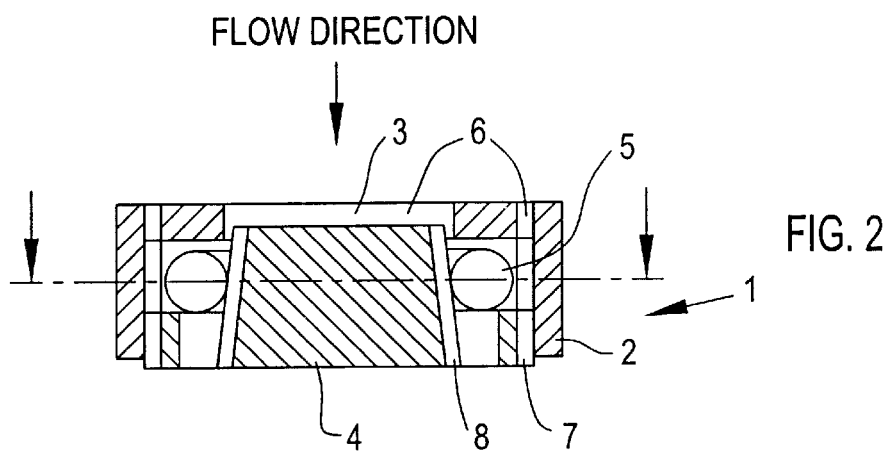
FIG. 2 is a longitudinal cross-section of the flow regulator from FIG. 1.
Figure 1:
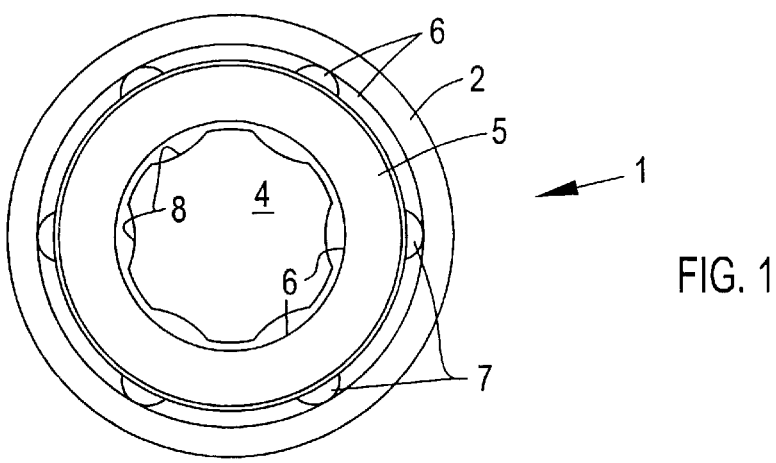
FIG. 1 is a cross-sectional view of a flow regulator taken through its regulator housing whereby the flow regulator has, on the inner surface area of its regulator housing as well as on the peripheral surface area of a central control peg in the peripheral direction, regulating recesses spaced apart from one another and oriented in the through flow direction.

A flow regulator is represented in FIGS. 1 and 2 which has a regulator housing 2. The regulator housing 2 of the flow regulator 1 is insertable in an inherently usual manner, for example, into the here not further represented intake nozzle of a sanitary armature or into the connection armature of a flexible hose line, in order to be able to keep the amount of water conveyed per unit time constant even with strong pressure fluctuations in the water supply lines.

The flow regulator 1 has a central control peg 4 which is held fixed in the housing in a passage channel 3 of the regulator housing. The control peg 4 is encompassed by an annular flow restrictor 5 of elastic material. As FIG. 2 shows, the control peg 4 is tapered somewhat conically, at least in the part region of its longitudinal extension encompassed by the flow restrictor 5 against the direction of flow Pf1.

The flow restrictor forms a control gap 6 between itself and the inner surface area of the regulator housing 2 defining the passage channel 3 and as well as between itself and the peripheral surface area of the control peg 4 the cross section of which is alterable through the flow restrictor 5 being deformed under the pressure differential forming with through flow.

As is to be recognized in FIG. 1, regulating recesses 7, 8 are provided on the inner surface area of the regulator housing 2 as well as on the peripheral surface area of the control peg 4, which are spaced at a distance from one another and which are oriented in the flow through direction Pf1. The regulating recesses 7, 8 are constructed open to in the inflow and outflow directions as well as toward the control gap 6.

While the regulating recesses 8 on the peripheral surface area of the control peg 4 have a larger unobstructed aperture width and already respond at lower pressure conditions of the flowing medium, the regulating recesses 7 situated on the inner surface area of the regulator housing 2 have in contrast a smaller unobstructed aperture width so that the elastic rubber flow restrictor can only penetrate (when a high pressure stress by the flowing medium acts upon it) into the regulating grooves or regulating recesses 7 on the inner surface area of the regulator housing 2.

Due to the more or less strong penetration of the elastic rubber flow restrictor 5 as a function of fluid pressure into the regulating recesses 7, 8, the amount of water flowing through the flow regulator 1 per unit of time is kept constant and cannot exceed, even with increasingly rising water pressure, a defined amount of water per unit of time.

While the regulating recesses 8 with the greater unobstructed aperture width have a somewhat circular segment-like cross section, the regulating recesses 7 on the inner surface area of the regulator housing 2 with the smaller unobstructed aperture width have a cross section which is steep sided and circle segment-like in the area of the bottom of the groove.

Figure 3:
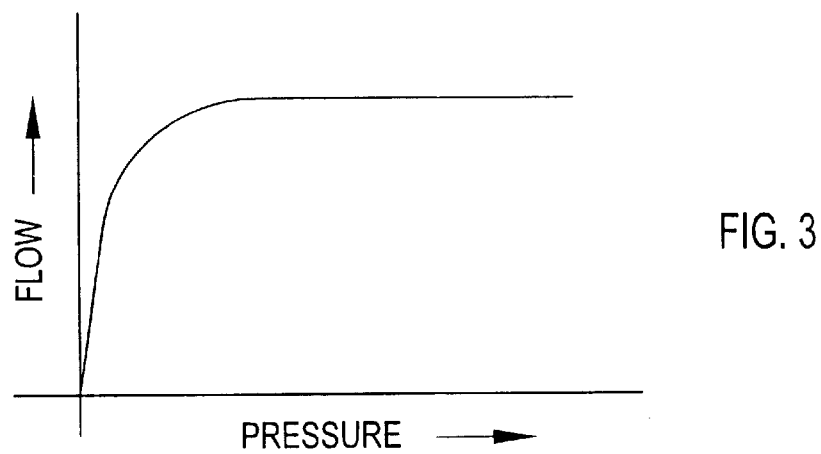
FIG. 3 is a graph of the through flow characteristics of the flow regulator in accordance with FIG. 1 and 2, whereby the amount of liquid flowing through the flow regulator per unit time is represented as a function of fluid pressure.

It becomes clear on the basis of the diagram represented in FIG. 3 that the flow regulator 1 is distinguished by a very good and even flow regulation due to the deformation modulated in the low as well as in the high pressure range by means of the variously shaped regulating recesses 7, 8. The flow regulator 1 reaches the desired through flow amount per unit of time already at a comparatively low fluid pressure and holds this amount of liquid constant even with increasing or strongly fluctuating fluid pressures. Since the flow restrictor of the flow regulator here represented can be deformed simultaneously and synchronously in the direction of the regulating recesses provided on both sides, and since on both sides of this flow restrictor, in any given case, a control gap is provided with parallel water streams to be adjusted, the flow regulator of the invention is distinguished by a comparatively high maximal through flow amount in contrast to a small installation size.

Figure 4:
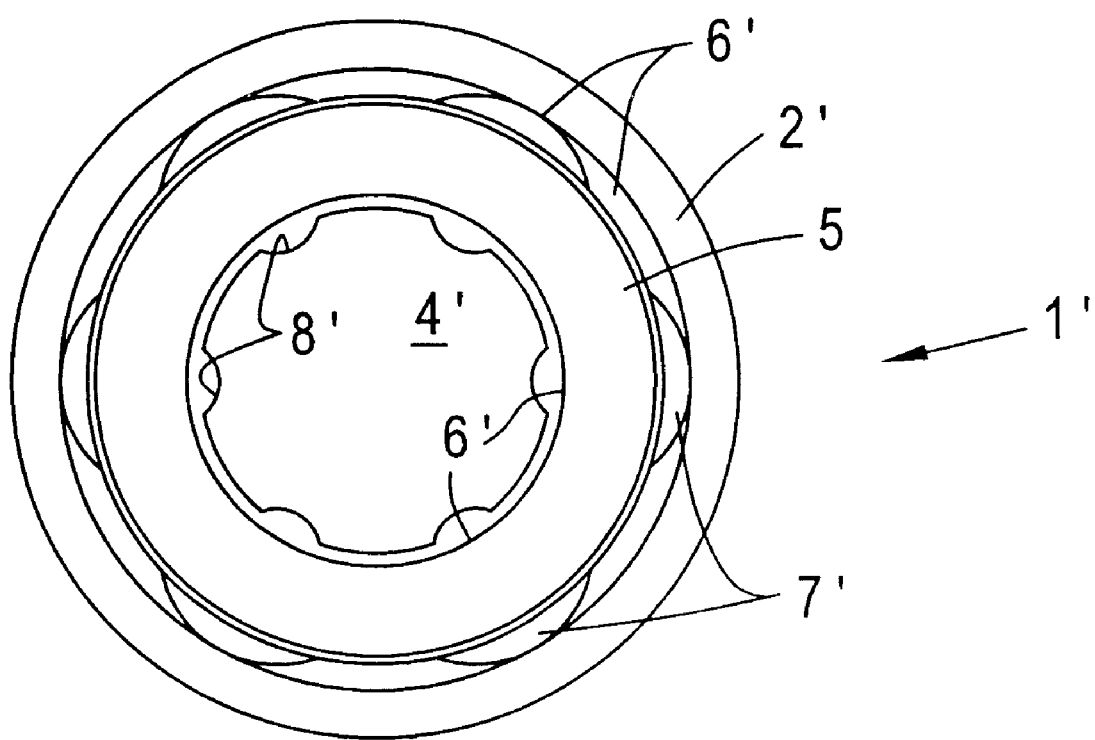
FIG. 4 is a longitudinal cross-section of an alternate embodiment of the flow regulator, similar to FIG. 2, in regulating recesses on the inner surface area of the regulator housing have an area greater than the regulating recesses on the peripheral surface area of the central control peg.

Referring now to FIG. 4, an alternate embodiment of the flow regulator 1' is shown which includes a regulator housing 2' and a control peg 4', similar to those described above in connection with the flow regulator 1. A flow restrictor 5 is located on the control peg 4' in the same manner as discussed above in connection with the flow regulator 1 in order to form control gaps 6' between the flow restrictor 5 and the inner housing 2' and between the flow restrictor and the peripheral surface area of the control peg 4'. Regulating recesses 7' are provided on the inner surface area of the housing 2', and regulating recesses 8' are provided on the peripheral surface area of the control peg 4'. The regulating recesses 7' on the inner surface area of the regulator housing 2' have a greater unobstructed aperture width than the regulating recesses 8' on the control peg 4'.

What is claimed is:

1. Flow regulator (1) comprising a regulator housing (2) which has a control peg (4) or control cone in a passage channel (3) encompassed by an annular flow restrictor (5) of elastic material, the flow restrictor (5) defines a control gap (6) between itself and at least one part fixed in the housing, the passage channel having a cross section which is alterable due to deformation of the flow restrictor (5) under a pressure differential formed during through flow, whereby, on the surface area of the at least one part fixed in the housing defining the control gap (6), regulating recesses (7, 8) are provided spaced at a distance from one another and oriented in the through flow direction, wherein the control gap (6) is provided both between the flow restrictor (5) and the inner surface area of the regulator housing defining the passage channel (3) as well as between the flow regulator (5) and the peripheral surface area of the control peg (4) or control cone, and the regulating recesses (7, 8) are provided on the inner surface area of the regulator housing (2) as well as on the peripheral surface area of the control peg (4) or control cone, wherein the regulating recesses have differently shaped cross sections in the region of the flow restrictor (5) and the regulating recesses (8) for responding in lower pressure ranges have a larger aperture width facing the flow restrictor (5) in comparison to the regulating recesses (7) for higher pressure ranges.

2. Flow regulator according to claim 1, wherein the regulating recesses (7) on the inner surface area of the regulator housing (2) have cross-sections that are the same size and the regulator recesses (8) on the peripheral surface area of the control peg (4) or the control cone have cross-sections that are the same and are different from the cross-sections of the regulator recesses on the inner surface area of the regulator housing.

3. Flow regulator according to claim 1, wherein the regulating recesses (7) have a differently shaped cross section on the inner surface area of the regulator housing (2) in comparison to those on the peripheral surface area of the control peg (4) or control cone.

4. Flow regulator according to claim 1, wherein the regulating recesses (7', 8) with a greater unobstructed aperture width are provided on the inner surface area of the regulator housing or on the peripheral surface area of the control peg (4) or control cone.

5. Flow regulator according to claim 1, wherein the regulating recesses (8) with the greater unobstructed aperture width have an approximately circular segment-like cross section.

6. Flow regulator according to claim 1, wherein the regulating recesses (7) with a smaller unobstructed aperture width are configured as a semicircle and/or steep sided at least in one partial area.

\* \* \* \* \*